(12) United States Patent
Watanabe et al.

(10) Patent No.: US 10,634,190 B2
(45) Date of Patent: Apr. 28, 2020

(54) HUB UNIT BEARING

(71) Applicant: NSK LTD., Shinagawa-ku, Tokyo (JP)

(72) Inventors: Masamitsu Watanabe, Fujisawa (JP);
Tatsuo Wakabayashi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/171,945

(22) Filed: Oct. 26, 2018

(65) Prior Publication Data

US 2019/0128326 A1    May 2, 2019

(30) Foreign Application Priority Data

Nov. 1, 2017 (JP) .................................. 2017-212131

(51) Int. Cl.
*F16C 33/38* (2006.01)
*F16C 19/18* (2006.01)
*B60B 27/02* (2006.01)

(52) U.S. Cl.
CPC ........ *F16C 33/3856* (2013.01); *F16C 19/184* (2013.01); *B60B 27/02* (2013.01); *F16C 19/186* (2013.01); *F16C 2326/02* (2013.01)

(58) Field of Classification Search
CPC .. F16C 33/38; F16C 33/3843; F16C 33/3856; F16C 33/586
See application file for complete search history.

(56) References Cited

U.S. PATENT DOCUMENTS 5,046,867 A * 9/1991 Hilby .................... F16C 41/007
324/207.2
2016/0025134 A1* 1/2016 Takio .................. F16C 33/3887
384/528

FOREIGN PATENT DOCUMENTS

JP          8-14258 A    1/1996
JP      2008-115981 A    5/2008

* cited by examiner

*Primary Examiner* — James Pilkington
(74) *Attorney, Agent, or Firm* — Sughrue Mion, PLLC

(57) ABSTRACT

A hub unit bearing includes: an outer ring member; an inner ring member; and a cage. The cage includes a large-diameter side annular portion, a small-diameter side annular portion, pillar portions which axially couple the large-diameter side annular portion and the small-diameter side annular portion, and pockets which are formed between the pillar portions adjacent to each other in a circumferential direction. The pillar portions are formed to be inclined from the small-diameter side annular portion toward the large-diameter side annular portion. An outer diameter surface of the small-diameter side annular portion is formed as a tapered surface which is diameter-expanded toward the large-diameter side annular portion. At least one of the outer diameter surface of the cage and an inner diameter surface of the cage is formed as a cylindrical surface.

2 Claims, 5 Drawing Sheets

HUB UNIT BEARING

CROSS-REFERENCE TO RELATED APPLICATIONS

The present application claims the benefit of priority of Japanese Patent Application No. 2017-212131, filed Nov. 1, 2017, the content of which is incorporated herein by reference.

TECHNICAL FIELD

Aspects of the present invention relate to a hub unit bearing, and more particularly, to a hub unit bearing including a cage.

BACKGROUND ART

As a conventional cage of a hub unit bearing, there is known an inclined cage which is formed in a tapered cylindrical shape and in which a plurality of pockets which hold rolling elements are provided at equal intervals in a circumferential direction at the middle of an axial width of the cage (see, JP-A-H08-014258). The cage is molded from synthetic resin, and includes inclined pillar portions provided between pockets, a small-diameter side annular portion which is a portion on a smaller diameter side of the pockets, and a large-diameter side annular portion which is a portion on a larger diameter side of the pockets. An inner diameter surface and an outer diameter surface of the respective small-diameter side annular portion and large-diameter side annular portion are formed in a cylindrical surface shape.

As the other conventional inclined cage, an inclined crown cage is known (see, e.g., JP-A-2008-115981). The cage has a hollow annular shape which is continuously tapered and diameter-shrunk from the large diameter side toward the small diameter side and is formed into a substantially truncated cone shape as a whole. A plurality of pockets which rotatably hold a plurality of rolling elements one by one are formed on the cage at equal intervals along the circumferential direction, and openings for inserting the rolling elements one by one from the large diameter side to the pockets is formed on the large diameter side.

The cage described in the above JP-A-H08-014258 and JP-A-2008-115981 is set in a state where a plurality of cages are stacked on a cage stocker (not shown) along an axial direction in a production line of a bearing. Therefore, before being set in the cage stocker, the plurality of cages are packaged in a stacked state (straight winding packaging).

In general, the inclined cage and the inclined crown cage as described above are manufactured by axial draw injection molding. Therefore, an outer diameter of the small-diameter side annular portion is smaller than an inner diameter of the large-diameter side annular portion, and when the cages are stacked by straight winding packaging or the like, the outer diameter of the small-diameter side annular portion is in contact with a thin portion of the inner diameter of a tapered pillar portion. When a force acts on the cages in the axial direction in this contact state, the thin portion of the inner diameter of the pillar portion is deformed or the outer diameter of the small-diameter side annular portion is fitted to the thin portion of the inner diameter of the pillar portion, so that there is a possibility that separation of the cage may be difficult in the cage stocker. The problem of this fitting is particularly occurring in the inclined crown cage.

In order to solve this problem, in the cage described in JP-A-2008-115981, a recessed portion is provided on an end surface on a large-diameter side, and an end portion on a smaller-diameter side is extended toward an axially outer side. When the cages are stacked, the end portion on the smaller diameter side of the adjacent cage is placed on the recessed portion.

However, in JP-A-2008-115981, since the cross-sectional area of the cage is increased, a contact angle of rolling elements is large, and it is difficult to use as a cage of a bearing having a high shoulder portion adjacent to a raceway groove. Since the cage is long in the axial dimension, the number of cages in a straight winding packaged state is decreased, so that the interval of supplying the cages to the cage stocker is shortened, which may increase the man-hour of workers.

SUMMARY

The present invention has been made in view of the problems described above, and an aspect of the present invention provide a hub unit bearing which can prevent deformation of a pillar portion and fitting between cages in a state where a plurality of cages are stacked and can increase the number of cages in a straight winding packaged state.

According to an embodiment of the present invention, there is provided a hub unit bearing including an outer ring member, an inner ring member which is provided rotatably with respect to the outer ring member via a plurality of rolling elements, and a cage which is configured to hold the plurality of rolling elements at substantially equal intervals in a circumferential direction. The cage includes a large-diameter side annular portion, a small-diameter side annular portion which is concentrically arranged with the large-diameter side annular portion, a plurality of pillar portions which axially couples the large-diameter side annular portion and the small-diameter side annular portion and provided at substantially equal intervals in the circumferential direction, and a plurality of pockets which are formed between the pillar portions adjacent to each other in the circumferential direction and configured to rollably hold the rolling elements respectively. The pillar portions are formed to be inclined from the small-diameter side annular portion toward the large-diameter side annular portion. The outer diameter surface of the small-diameter side annular portion is formed as a tapered surface which is diameter-expanded toward the large-diameter side annular portion. At least one of the outer diameter surface of the cage and an inner diameter surface of the cage is formed as a cylindrical surface.

In the above hub unit bearing, both the outer diameter surface of the cage and the inner diameter surface of the cage may be formed as a cylindrical surface.

According to the above configuration, the cage includes the large-diameter side annular portion, the small-diameter side annular portion which is concentrically arranged with the large-diameter side annular portion, the plurality of pillar portions which axially couple the large-diameter side annular portion and the small-diameter side annular portion and are provided at substantially equal intervals in the circumferential direction; and the plurality of pockets which are formed between the pillar portions adjacent to each other in the circumferential direction and configured to rollably hold the rolling elements respectively. The pillar portions are formed to be inclined from the small-diameter side annular portion toward the large-diameter side annular portion. The outer diameter surface of the small-diameter side annular portion is formed as a tapered surface which is diameter-expanded toward the large-diameter side annular portion. At least one of the outer diameter surface of the cage and an inner diameter surface of the cage is formed as a cylindrical surface. Therefore, it is possible to prevent deformation of the pillar portion and the fitting between the cages in a state where the plurality of cages are stacked and to increase the number of cages in the straight winding packaged state.

DESCRIPTION OF EMBODIMENTS

Hereinafter, a hub unit bearing according to an embodiment of the present invention will be described in detail with reference to the drawings.

Figure 1:
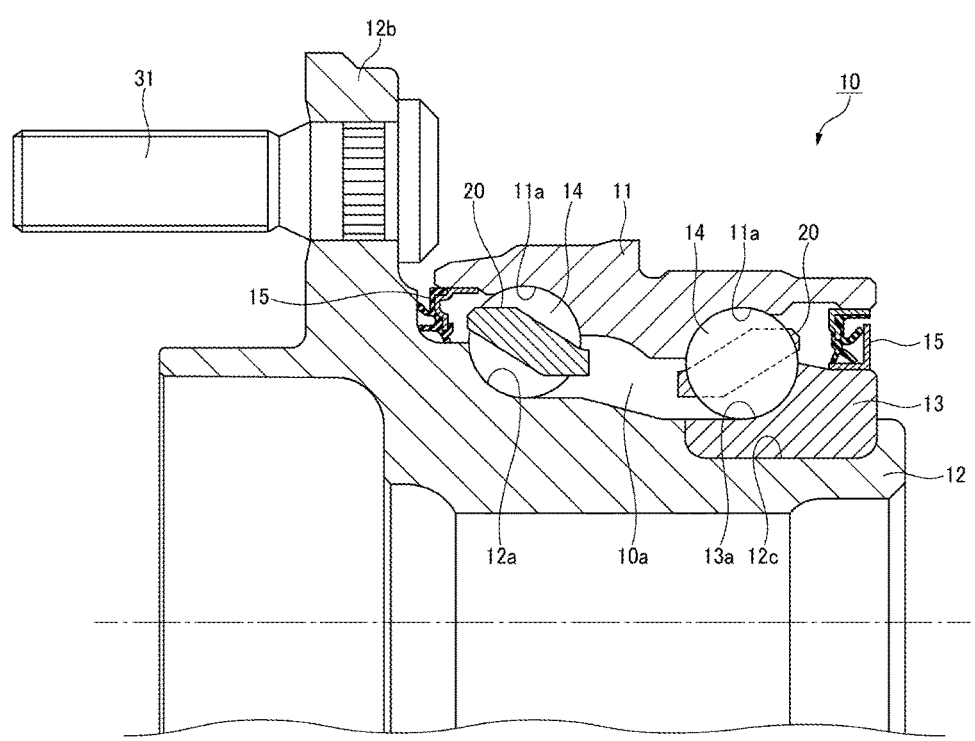
FIG. 1 is a cross-sectional view illustrating a hub unit bearing according to an embodiment of the present invention.

The hub unit bearing 10 of the present embodiment is a hub unit bearing for driven wheels and includes: an outer ring member 11; a hub spindle 12 which is an inner ring member; an inner ring 13 which is an inner ring member separate from hub spindle 12 and is integrally fixed to the hub spindle 12; a plurality of balls (rolling elements) 14 which are arranged in two rows so as to be rollable between an outer diameter surface of the hub spindle 12 and the inner ring 13 and an inner diameter surface of the outer ring member 11; a pair of cages 20 which hold the two rows of the plurality of balls 14 respectively at substantially equal intervals in the circumferential direction; and a pair of seal devices 15 which block both end portion openings of the bearing inner space 10a as shown in FIG. 1.

The hub spindle 12 is a substantially cylindrical member, and a flange portion 12b extending radially outward from the outer diameter surface is formed on an axially outboard end portion (left side in the drawing). A plurality of hub bolts 31 for fastening a tire wheel, a brake rotor and the like (not shown) are provided on the flange portion 12b at substantially equal intervals in the circumferential direction.

A small-diameter step portion 12c is formed on an axially inboard end portion (right side in the drawing) of the hub spindle 12. After the inner ring 13 is externally fitted to the small-diameter step portion 12c, the inner ring 13 is fixed to the hub spindle 12 by crimping the end portion of the small-diameter step portion 12c toward a radially outward. An appropriate preload is applied by pressing the inner ring 13 by crimping.

Two rows of outer ring raceway surfaces 11a, 11a parallel to each other are formed apart from each other on the inner diameter surface of the outer ring member 11. Inner ring raceway surfaces 12a, 13a are formed on the outer diameter surface of the hub spindle 12 and the inner ring 13 respectively so as to correspond to the outer ring raceway surfaces 11a, 11a of the outer ring member 11. The plurality of balls 14 are rollably held by the cage 20 at equal intervals in the circumferential direction on the two rows of raceways formed by the inner ring raceway surfaces 12a, 13a and the outer ring raceway surfaces 11a, 11a.

The plurality of balls 14 are in contact with the outer ring raceway surfaces 11a, 11a and the inner ring raceway surfaces 12a, 13a at a predetermined contact angle to form a back-to-back arrangement (DB) bearing. Accordingly, the hub spindle 12 and the inner ring 13 are rotatable with respect to the outer ring member 11.

Figure 2:
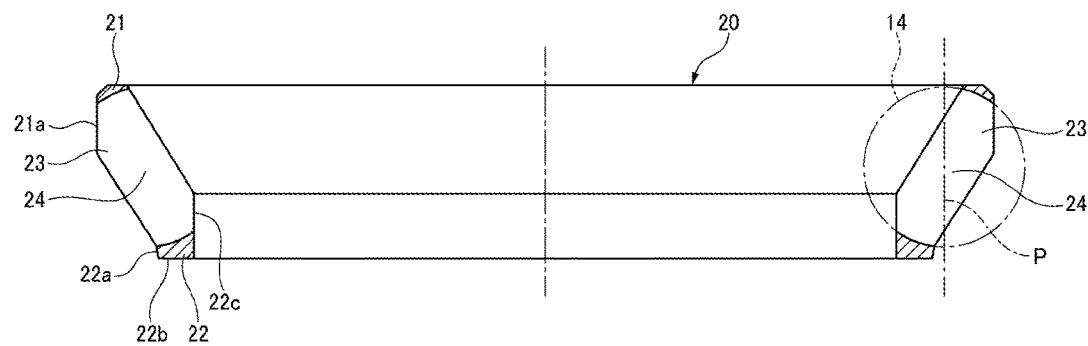
FIG. 2 is a cross-sectional view illustrating a cage shown in FIG. 1.
Figure 3:
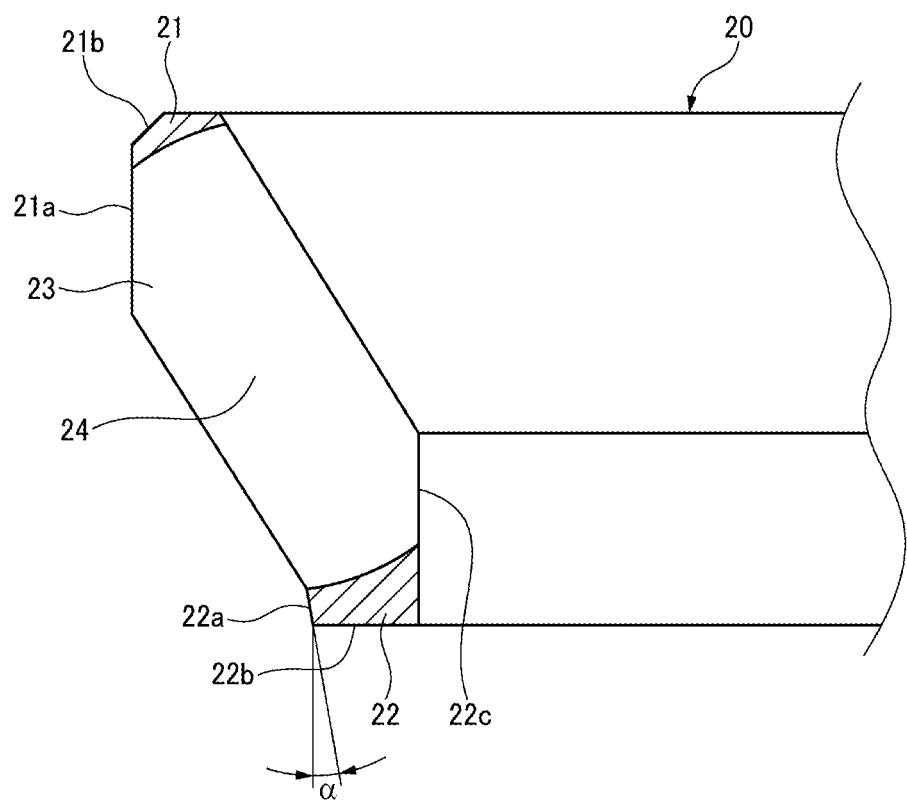
FIG. 3 is a partially enlarged cross-sectional view of the cage shown in FIG. 2.

As shown in FIGS. 2 and 3, the cage 20 is formed into a substantially conical cylindrical shape by injection molding of a synthetic resin, and includes: a large-diameter side annular portion 21; a small-diameter side annular portion 22 which is concentrically arranged with the large-diameter side annular portion 21; a plurality of pillar portions 23 which axially couple the large-diameter side annular portion 21 and the small-diameter side annular portion 22 and are provided at substantially equal intervals in the circumferential direction; a plurality of pockets 24 which are formed between the pillar portions 23 adjacent to each other in the circumferential direction and rollably holds the plurality of balls 14 respectively. In the present embodiment, the pair of cages 20 are symmetrically arranged such that the small-diameter side annular portions 22 face each other in the axial direction.

In the present embodiment, in the plurality of pillar portions 23 of the cage 20, a small diameter side end portion is connected in the circumferential direction by the small-diameter side annular portion 22, and a large-diameter side end portion is connected in the circumferential direction by the large-diameter side annular portion 21, so that a rigidity of the cage 20 in the circumferential direction is improved. Therefore, the rigidity is higher than that of the inclined crown cage where of only one end portions of the pillar portions in the axial direction are connected in the circumferential direction by an annular portion.

The pillar portion 23 is formed to be inclined so as to be diameter-expanded from the small-diameter side annular portion 22 toward the large-diameter side annular portion 21. The inner peripheral surface of the pocket 24 is formed in a spherical shape following the outer shape of the ball 14. Therefore, an axial middle portion of the pillar portion 23 is a thin portion having a thinner circumferential wall thickness than the other portions. In the present embodiment, the outer diameter surface and the inner diameter surface of the pillar portion 23 are formed concentrically and parallel to a center axis of the cage 20.

As shown in FIG. 3, the outer diameter surface 22a of the small-diameter side annular portion 22 is formed as a tapered surface (partial circular conical surface) which is diameter-expanded toward the large-diameter side annular portion 21. Therefore, a ridge between the outer diameter surface 22a of the small-diameter side annular portion 22 and an axially outer end surface 22b has an obtuse angle (90° or more). In the present embodiment, the angle α of the tapered surface of the outer diameter surface 22a with respect to a cage axis direction is set to 10°, for example.

As shown in FIG. 3, the outer diameter surface 21a of the cage 20 includes an outer diameter surface of the large-diameter side annular portion 21 formed continuously in the circumferential direction and an outer diameter surface of each pillar portion 23 formed discontinuously in the circumferential direction, and is formed as a single cylindrical surface in which an outer diameter is constant along the axial direction. Similarly, the inner diameter surface 22c of the cage 20 includes an inner diameter surface of the small-diameter side annular portion 22 formed continuously in the circumferential direction and an inner diameter surface of each pillar portion 23 formed discontinuously in the circumferential direction, and is formed as a single cylindrical surface in which an inner diameter is constant along the axial direction. A chamfered portion 21b is formed on an axial outer peripheral edge of the outer peripheral surface of the large-diameter side annular portion 21, so as to improve insertability of a hooking claw of the cage stocker (described later). In the present embodiment, the inner diameter surface of the large-diameter side annular portion 21 has a larger diameter than the pitch circle diameter P of the balls 14, and the outer diameter surface 22a of the small-diameter side annular portion 22 has a smaller diameter than the pitch circle diameter P of the balls 14.

Next, a state where a plurality of cages 20 of the present embodiment are stacked will be described with reference to FIGS. 4 and 5.

Figure 4:
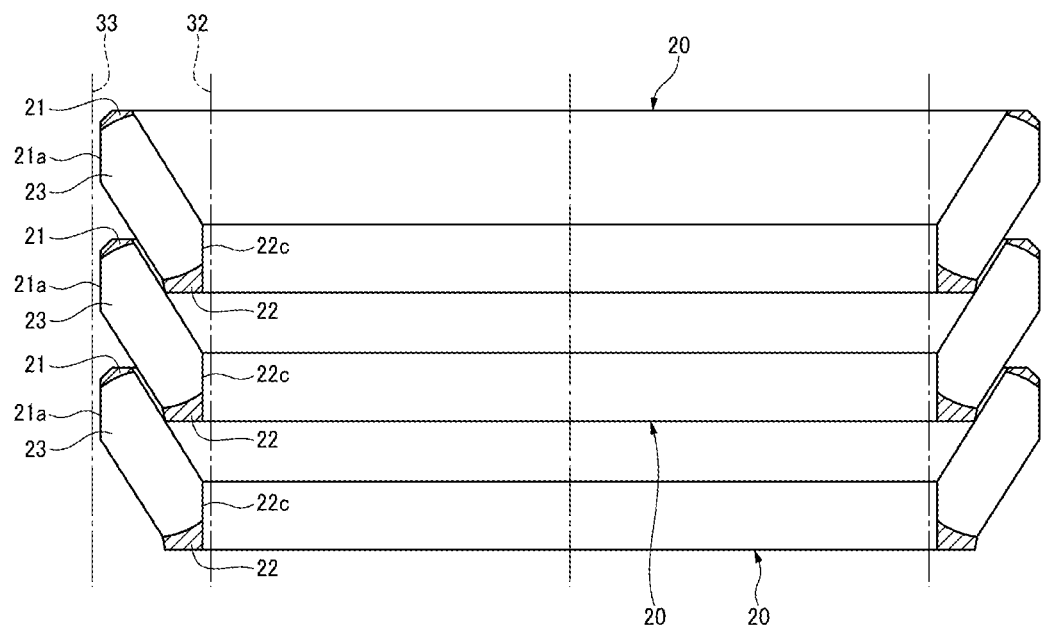
FIG. 4 is a cross-sectional view illustrating a state where a plurality of cages shown in FIG. 1 are stacked.

As shown in FIG. 4, in a production line of the hub unit bearing 10, a plurality of cages 20 are stacked along an axial direction so as to be concentric with each other before being set in the cage stocker (not shown) and are packaged by straight winding package in this state.

Figure 5:
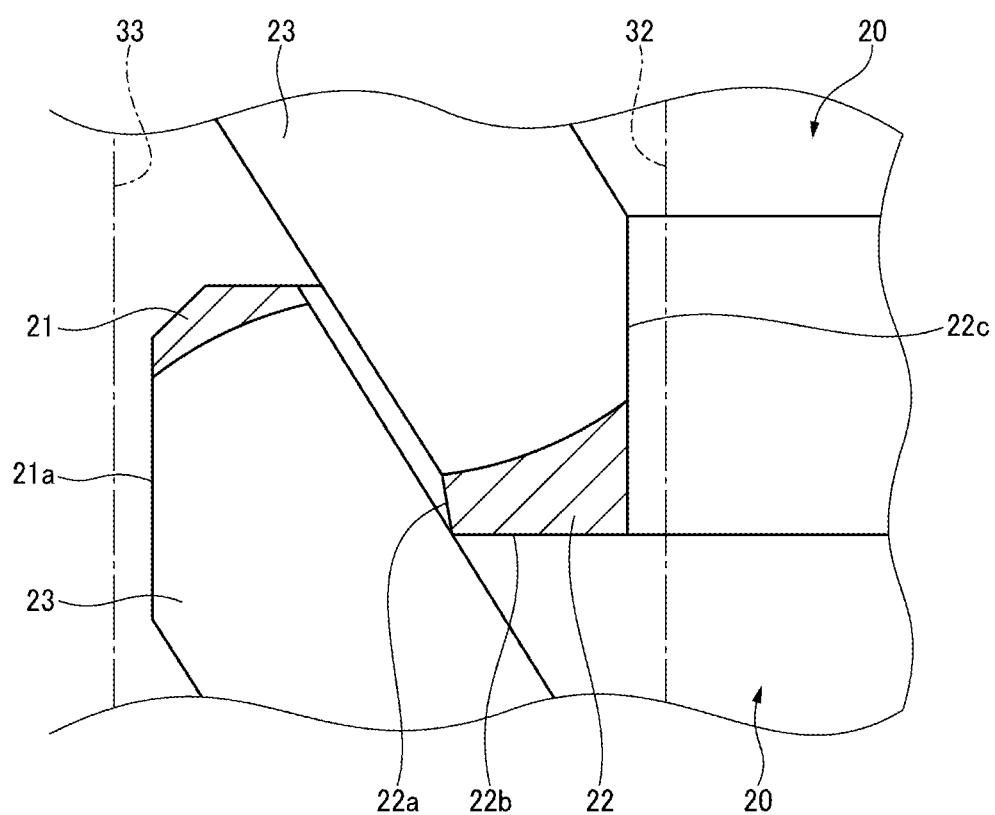
FIG. 5 is a partially enlarged cross-sectional view of the cages in the stacked state shown in FIG. 4.

In a state where the cages 20 are stacked, as shown in FIG. 5, the ridge of the small-diameter side annular portion 22 of the cage 20 located above (ridge between the outer diameter surface 22a and the axially outer end surface 22b) is in contact with the inner diameter surface of the pillar portion 23 of the cage 20 located below. Therefore, in the present embodiment, the large-diameter side end portions of the plurality of pillar portions 23 are connected in the circumferential direction by the large-diameter side annular portion 21, so that the circumferential rigidity of the cage 20 is improved, and the outer diameter surface 22a of the small-diameter side annular portion 22 is formed as a tapered surface which is diameter-expanded toward the large-diameter side annular portion 21 so as to make the ridge of the small-diameter side annular portion 22 the obtuse angle. Thus, even if a force is applied in the axial direction in a state where the cage 20 is stacked, stress concentration at the contact portion between the ridge of the small-diameter side annular portion 22 and the other pillar portion 23 is alleviated, so that the deformation of the pillar portion 23 (diameter-expansion and biting) and the fitting of the ridges of the small-diameter side annular portion 22 to the pillar portion 23 (fitting of the cage 20 with each other) can be prevented. In the present embodiment, an axial dimension of the large-diameter side annular portion 21 is shorter than an axial dimension of the small-diameter side annular portion 22 so as to prevent the large-diameter side annular portion 21 from contacting the other pillar portion 23 in a state where the cages 20 are stacked.

Further, in the present embodiment, when the cages 20 are stacked, one cage 20 is axially inserted to the other cage 20 until the pillar portion 23 of the one cage 20 radially overlaps the pillar portion 23 of the other cage 20. Therefore, the number of the cages 20 in the straight winding packaged state can be increased. Accordingly, in a bearing assembly process, it is possible to lengthen the interval of supplying the cages to the cage stocker and reduce the man-hour of workers.

In the present embodiment, since the outer diameter surface 21a of the cage 20 and the inner diameter surface 22c of the cage 20 are respectively formed on the cylindrical surfaces along the axial direction, the inner diameter surface 22c of the cage 20 is used as a guide surface for a method such as passing a center bar 32 (see FIG. 4) through the inner diameter surface 22c of the cage 20, thereby facilitating the straight winding packaging. Further, the outer diameter surface 21a of the cage 20 may be used as the guide surface for a method such as fitting the cage 20 into a guide hole 33 (see FIG. 4) which guides the outer diameter surface 21a of the cage 20.

Further, in the present embodiment, when the cage 20 is set in the cage stocker, centering of the cage 20 can be performed by using the outer diameter surface 21a of the cage 20 or the inner diameter surface 22c of the cage 20 as the guide surface, and the cage 20 can be reliably separated out by the hooking claw of the cage stocker.

In the present embodiment, since the outer diameter surface 21a of the cage 20 and the inner diameter surface 22c of the cage 20 are respectively formed on the cylindrical surfaces along the axial direction, the cross-sectional area of the cage 20 is small. Therefore, the cage 20 can be used in a bearing having a large contact angle of the ball and a high shoulder portion adjacent to a raceway groove.

As described above, according to the hub unit bearing 10 of the present embodiment, the large-diameter side end portions of the plurality of pillar portions 23 are connected in the circumferential direction by the large-diameter side annular portion 21, so that the circumferential rigidity of the cage 20 is improved, and the outer diameter surface 22a of the small-diameter side annular portion 22 is formed as the tapered surface which is diameter-expanded toward the large-diameter side annular portion 21 so as to make the ridge of the small-diameter side annular portion 22 have an obtuse angle. Thus, even if a force is applied in the axial direction in a state where the cages 20 are stacked, the stress concentration at the contact portion between the ridge of the small-diameter side annular portion 22 and the other pillar portion 23 is alleviated, so that the deformation of the pillar portion 23 (diameter-expansion and biting) and the fitting of the ridge of the small-diameter side annular portion 22 to the pillar portion 23 (fitting of the cage 20) can be prevented.

Further, according to the hub unit bearing 10 of the present embodiment, since the pillar portion 23 of the cage 20 radially overlaps the pillar portion 23 of the adjacent cage 20 when the cages 20 are stacked, the number of the cages 20 in the straight winding packaged state can be increased. Accordingly, in the bearing assembly process, it is possible to lengthen the interval of supplying the cages to the cage stocker and reduce the man-hour of workers.

Further, according to the hub unit bearing 10 of the present embodiment, since the outer diameter surface 21a of the cage 20 and the inner diameter surface 22c of the cage 20 are respectively formed on the cylindrical surfaces along the axial direction, the outer diameter surface 21a of the cage 20 and the inner diameter surface 22c of the cage 20 can be used as the guide surfaces to facilitate the straight winding packaging. Further, when the cage 20 is set in the cage stocker, the centering of the cage 20 can be performed by using the outer diameter surface 21a of the cage 20 or the inner diameter surface 22c of the cage 20 as the guide surface, and the cage 20 can be reliably separated out by the hooking claw of the cage stocker.

The present invention is not limited to the embodiments described above, and can be appropriately changed without departing from the spirit of the present invention. For example, in the present embodiment, both the outer diameter surface 21a of the cage 20 and the inner diameter surface 22c of the cage 20 are formed as the cylindrical surface. However, the present invention is not limited thereto, and only one of the outer diameter surface 21a of the cage 20 and the inner diameter surface 22c of the cage 20 may be formed as the cylindrical surface.

The invention claimed is:

1. A hub unit bearing comprising:

an outer ring member;

an inner ring member which is provided rotatably with respect to the outer ring member via a plurality of rolling elements; and a cage which is configured to hold the plurality of rolling elements at substantially equal intervals in a circumferential direction, wherein the cage includes:

a large-diameter side annular portion;

a small-diameter side annular portion which is concentrically arranged with the large-diameter side annular portion;

a plurality of pillar portions which axially couple the large-diameter side annular portion and the small-diameter side annular portion and are provided at substantially equal intervals in the circumferential direction; and a plurality of pockets which are formed between the pillar portions adjacent to each other in the circumferential direction and configured to rollably hold the rolling elements respectively, wherein the pillar portions are formed to be inclined from the small-diameter side annular portion toward the large-diameter side annular portion, wherein an outer diameter surface of the small-diameter side annular portion is formed as a tapered surface which is diameter-expanded toward the large-diameter side annular portion, and wherein at least one of an outer diameter surface of the large-diameter side annular portion and an inner diameter surface of the small-diameter side annular portion is formed as a cylindrical surface, wherein a taper angle of the outer diameter surface of the small-diameter side annular portion is smaller than a taper angle of an outer diameter surface of the pillar portion, and wherein an angle of the tapered surface of the outer diameter surface of the small-diameter side annular portion with respect to a cage axis direction is 10 degrees.

2. The hub unit bearing according to claim 1, wherein both the outer diameter surface of the large-diameter side annular portion and the inner diameter surface of the small-diameter side annular portion are formed as a cylindrical surface.

* * * * *